United States Patent
Dietz

(10) Patent No.: US 12,381,433 B2
(45) Date of Patent: Aug. 5, 2025

(54) STATOR FOR AN ELECTRIC MACHINE, MOLD FOR PRODUCING A STATOR, METHOD FOR PRODUCING A STATOR AND ELECTRIC MACHINE FOR A VEHICLE

(71) Applicant: Valeo eAutomotive Germany GmbH, Erlangen (DE)

(72) Inventor: William Dietz, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 236 days.

(21) Appl. No.: 18/304,937

(22) Filed: Apr. 21, 2023

(65) Prior Publication Data
US 2023/0344296 A1  Oct. 26, 2023

(30) Foreign Application Priority Data
Apr. 21, 2022  (EP) ..................................... 22169255

(51) Int. Cl.
H02K 3/34       (2006.01)
H02K 3/28       (2006.01)
H02K 15/10     (2006.01)

(52) U.S. Cl.
CPC ................. *H02K 3/34* (2013.01); *H02K 3/28* (2013.01); *H02K 15/105* (2013.01)

(58) Field of Classification Search
CPC ........... H02K 3/28; H02K 3/34; H02K 15/105
USPC ........................................................ 310/208
See application file for complete search history.

(56) References Cited

U.S. PATENT DOCUMENTS

| | | | | |
|---|---|---|---|---|
| 6,137,201 A | * | 10/2000 | Umeda | H02K 9/06 310/201 |
| 2001/0011851 A1 | * | 8/2001 | Asao | H02K 15/066 310/179 |
| 2009/0102309 A1 | * | 4/2009 | Kamibayashi | H02K 3/12 310/195 |

(Continued)

FOREIGN PATENT DOCUMENTS

| JP | 53-57403 A | 5/1978 |
|---|---|---|
| JP | 2000-209802 A | 7/2000 |
| JP | 2014-23210 A | 2/2014 |

OTHER PUBLICATIONS

European Search Report issued Dec. 22, 2022 in EP Application 22169255.1 filed Apr. 21, 2022, 10 pages (with English Translation of Categories of Cited Documents & Written Opinion).

*Primary Examiner* — Rashad H Johnson
(74) *Attorney, Agent, or Firm* — Oblon, McClelland, Maier & Neustadt, L.L.P.

(57) ABSTRACT

Stator for an electric machine includes a stator core which has an axial end side, and a a plurality of shaped conductors which protrude from the stator core at the end side and which each have, at the end side, at least one end portion having a free end of the shaped conductor. Arrangements of at least two of the end portions are connected to one another in an electrically conductive and mechanical manner in such a way that each arrangement forms a connecting portion which has a first cross-sectional area that lies in a predefined cross-sectional plane and that has corner portions and side portions lying between the corner portions. A plurality of insulation elements each envelop at least one of the connecting portions and are each formed from an electrically insulating material.

20 Claims, 8 Drawing Sheets

(56) References Cited

U.S. PATENT DOCUMENTS

| | | | |
|---|---|---|---|
| 2012/0319507 A1* | 12/2012 | Ueno | H02K 3/345 |
| | | | 310/43 |
| 2012/0326554 A1* | 12/2012 | Kinpara | H02K 3/345 |
| | | | 310/216.004 |
| 2013/0049514 A1 | 2/2013 | Ikuta et al. | |
| 2021/0305865 A1* | 9/2021 | Matsumoto | H02K 1/16 |

* cited by examiner

STATOR FOR AN ELECTRIC MACHINE, MOLD FOR PRODUCING A STATOR, METHOD FOR PRODUCING A STATOR AND ELECTRIC MACHINE FOR A VEHICLE

The present invention relates to a stator for an electric machine, comprising: a stator core which has an axial end side; a plurality of shaped conductors which protrude from the stator core at the end side and which each have, at the end side, at least one end portion comprising a free end of the shaped conductor, wherein arrangements of at least two of the end portions are connected to one another in an electrically conductive and mechanical manner in such a way that each arrangement forms a connecting portion which has a first cross-sectional area that lies in a predefined cross-sectional plane and that has corner portions and side portions lying between the corner portions; and a plurality of insulation elements which each envelop at least one of the connecting portions and which are each formed from an electrically insulating material.

In addition, the invention relates to a mold for producing a stator, to a method for producing a stator, to an electric machine for a vehicle and to a vehicle.

US 2013/0049514 A1 discloses an electric machine with a stator. The stator has a stator core and a stator winding, which has a multiplicity of conductor segments with a coil end portion protruding from an axial end of the stator core. The coil end portions comprise joined end portions. A joining area between the joined end portions is covered by an insulation part composed of a resin.

In a stator formed with shaped conductors, insulation elements are used to insulate connecting portions which are connected in an electrically conductive and mechanical manner. The insulation elements may be formed, for example, by immersion into a coating material, for example a powder or a gel. It is disadvantageous here that the insulation element is formed only with a small material thickness in the region of corner portions of the connecting portions owing to edge thinning of the coating material. However, such corner portions are typically the regions in which the greatest electrical field strengths occur, and therefore particularly require efficient insulation. If, by contrast, the immersion process is conducted such that the greatest possible material thickness of the insulation elements is achieved, there is, in turn, the risk of bridge formations between the insulation elements of adjacent connecting portions. Such bridges result in an increased risk of crack formation, which is further promoted by internal stresses, but also by operation of the electric machine, that is to say (undesired) oscillations and vibrations. As a result, dielectric breakdown may occur. The electrically conducting material of the shaped conductors may also be exposed.

It has already been proposed that all the connecting portions be potted by way of a single potting body so as to directly adjoin the stator core, that is to say that what is referred to as full potting be carried out. However, this leads to elevated material and process costs, to inferior power density and to efficiency losses during operation of the electric machine. Moreover, dissipation of heat from the connecting portions is made more difficult by the potting body, particularly in the case of liquid-cooled stators. Furthermore, additional costs and additional material outlay are produced by an injection-molded part to be filled with the potting compound. Here, too, there is the risk of crack formation in the event of material accumulations in the injection-molded part.

The invention is based on the object of specifying a possibility for improved electrical insulation of connecting portions of the shaped conductors of a stator.

This object is achieved according to the invention, in the case of a stator of the type mentioned in the introduction, in that each insulation element has a second cross-sectional area which lies in the cross-sectional plane and which has, for each corner portion of the first cross-sectional area of the connecting portion enveloped by the insulation element, an additional area and sides lying between the additional areas, wherein a respective one of the additional areas extends further in a direction pointing away from the first cross-sectional area than the sides which adjoin the additional area.

The stator according to the invention has a stator core. The stator core has an axial end side. The stator also has a plurality of shaped conductors. The shaped conductors protrude from the stator core at the end side. The shaped conductors each have an end portion at the end side. The end portion comprises at least one free end of the shaped conductor. Arrangements of at least two of the end portions are connected to one another in an electrically conductive and mechanical manner in such a way that each arrangement forms a connecting portion. The connecting portion has a first cross-sectional area. The first cross-sectional area lies in a predefined cross-sectional plane. The first cross-sectional plane has corner portions. The first cross-sectional area also has side portions. The side portions lie between the corner portions. The stator also has a plurality of insulation elements. The insulation elements each envelop at least one of the connecting portions. The insulation elements are each formed from an electrically insulating material. Each insulation element has a second cross-sectional area. The second cross-sectional area has, for each corner portion of the first cross-sectional area of the connecting portion enveloped by the insulation element, an additional area. The second cross-sectional area also has sides. The sides lie between the additional areas. A respective one of the additional areas extends further in a direction than the sides which adjoin the additional area. The direction points away from the first cross-sectional area.

In the case of the stator according to the invention, provision is made for the second cross-sectional area of the insulation element to have, for each corner portion of the first cross-sectional area, an additional area and for the material thickness of the insulation element to thus be increased at the location where increased electrical field strengths are to be expected owing to the geometry of the connecting portions. As a result, undesired dielectric breakdown in the region of the corner portions can be effectively prevented and the insulation efficiency of the insulation elements can be increased. The fact that the additional areas extend further in the direction pointing away from the first cross-sectional area than the sides which adjoin the additional area makes it possible, so to speak, for undesired bridge formation between the sides of adjacent insulation elements to be counteracted. Since at the side portions of the first cross-sectional area of the connecting portions typically lower electrical field strengths occur than in the region of the corner portions, sufficiently efficient insulation is also made possible in the region of the side portions. This makes it possible for the insulation elements to be formed to be as thin as possible and as thick as necessary with respect to the periphery of the connecting portions.

The stator core of the stator according to the invention may be formed from a multiplicity of individual laminations which are layered axially and/or electrically insulated in relation to one another. In this respect, the stator core can also be considered to be a laminated stator core. The stator core may have a further end side which lies opposite to the axial end side. A multiplicity of slots which are arranged distributed in a peripheral direction and which extend axially from the end side to the further end side may be formed in the stator core.

Preferably, at least some of the shaped conductors have two free ends at the end side. Between the free ends, the shaped conductor may extend in one piece in different slots through the stator core. At the second end side, the shaped conductor may have a bending portion which protrudes from the stator core and which forms an offset in the peripheral direction between inner portions of the shaped conductor which lie within the stator core.

The cross-sectional plane is in particular perpendicular to the axial direction and/or to the extent direction of the end portions. The additional areas may each be in the form of a bulge. The arrangements of the end portions may be pairs of the end portions. However, each arrangement may also comprise three, four or more end portions. The arrangements of the end portions are preferably connected to one another in a materially bonded manner, in particular by welding, in an electrically conductive and mechanical manner. Provision is preferably made for the shaped conductors to have an electrically insulating surface coating and to be stripped in the region of the end portions, such that the insulation element rests directly on an electrically conductive material of the shaped conductors. The insulation elements may overlap the surface coating. The insulation elements are preferably formed from an enveloping material which is transformed into a one-piece, solid form. The enveloping material may be a resin, in particular a one-component resin or a two-component resin, which has been transformed into the one-piece, solid form by curing and/or gelling. The enveloping material may also be a powder material, for example a resin present in powder form, which has been transformed into the one-piece, solid form for example by a sintering process, in particular fluidized bed sintering.

Each connecting portion preferably has four corner portions and/or four side portions. Each additional area preferably adjoins two sides. Each side preferably adjoins two additional areas directly. The sides adjoining an additional area preferably lie on two straight lines which intersect at a right angle.

The connecting portions are preferably arranged distributed over the peripheral direction along a circle or a plurality of concentric circles.

In the case of the stator according to the invention, the additional areas may have a smaller radius than the sides. As a result, a respective additional area may form an insulation which radially surrounds the corner portion. In particular, in order to keep the material consumption by the insulation elements low, it is preferred for the sides to run rectilinearly. The additional areas may be rounded. The sides may be rectilinear.

The sides may have a corrugated profile. The sides may have a curved profile following a large radius. Different sides of an insulation element may have different or identical profiles.

With regard to the formation of the insulation elements by a method which uses a mold body, as will be explained further below, it is possible in the case of the stator according to the invention to obtain a tolerance compensation in terms of the position of the connecting portions with respect to the mold body. The tolerance compensation makes it possible to compensate for a position deviation of the connecting portions which deviates from an exact concentric or uniform distribution of the connecting portions and which is caused for example by a bending process of the end portions:

Provision may thus be made for the first cross-sectional area to have four of the corner portions and a first centre point defined by a point of intersection of two diagonals which connect non-peripherally adjacent corner portions, and for the second cross-sectional area to have four of the additional areas and a second centre point defined by a point of intersection of two diagonals which connect non-peripherally adjacent additional areas, wherein, in the case of at least some of the connecting portions and of the insulation elements enveloping them, the centre points are displaced in relation to one another, such that the smallest distance of a respective corner portion from an edge of the additional area assigned thereto is greater than the smallest distance of the side portions from the sides of the second cross-sectional area.

As an alternative or in addition, provision may be made in the case of the stator according to the invention that, in the case of at least some of the connecting portions and of the insulation elements enveloping them, the side portions of the first cross-sectional area are rotated in relation to the sides of the second cross-sectional area, such that the smallest distance of a respective corner portion from an edge of the additional area assigned thereto is greater than the smallest distance of the side portions from the sides of the second cross-sectional area.

Furthermore, provision may be made in the case of the stator according to the invention that, in the case of at least some of the connecting portions and of the insulation elements enveloping them, the two corner portions formed by one of the shaped conductors of the arrangement are displaced in relation to the two corner portions formed by the other or another of the shaped conductors of the arrangement, such that the smallest distance of a respective corner portion from an edge of the additional area assigned thereto is greater than the smallest distance of the side portions from the sides of the second cross-sectional area. As a result, tolerances in the position of two free ends of the shaped conductors during connection to the connecting portion can be compensated.

In the case of the stator according to the invention, it is additionally preferred for each insulation element to have a convex protuberance at the free ends. Such a protuberance may ensure a sufficient material thickness of the insulation elements when free ends of the shaped conductors are connected on their axial end faces, for example with formation of rounded material accumulations.

In the case of the stator according to the invention, provision may furthermore be made for each insulation element to have a profile which tapers from its end facing the stator core towards an intermediate position lying between the end and the cross-sectional plane. Furthermore, the material thickness of a respective insulation element may increase at the intermediate position so as to form a shoulder. As a result, a collar-like widening of the insulation element may be formed at the end, in order to cover bends of the shaped conductors, said bends pointing away from one another, between the end of the insulation element and the intermediate position.

The object on which the invention is based is also achieved by a mold for producing a stator, in particular according to the invention, for an electric machine, comprising a mold body and a plurality of blind holes which are arranged along a circle and which are each configured to receive a connecting portion, which is formed by an arrangement of at least two end portions which comprise a respective free end of shaped conductors of the stator and which are connected to one another in an electrically conductive and mechanical manner, and a flowable or pulverulent enveloping material.

The mold according to the invention for producing a stator for an electric machine comprises a mold body. The mold further comprises a plurality of blind holes arranged along a circle. The blind holes are each configured to receive a connecting portion. The connecting portion is formed by an arrangement of at least two end portions. The end portions comprise a respective free end of shaped conductors of the stator. The end portions are connected to one another in an electrically conductive and mechanical manner. The blind holes are also configured to receive a flowable or pulverulent enveloping material.

In the case of the mold body according to the invention, the blind holes may also be arranged along a plurality of concentrically arranged circles. The blind holes may be lined with a coating that reduces an adhesion of the mold body. The coating is preferably formed from plastics which are non-polar and/or have a low surface tension. The coating in particular comprises silicones, polytetrafluoroethylene (PTFE), fluoroethylene-propylene (FEP) or perfluoroalkoxy polymers (PFA). The mold body may be formed from a metal. The mold body may be formed from a non-metallic material, for example an, optionally fibre-reinforced, amorphous plastic or a ceramic. The blind holes may have ejection bevels. In this case, the ejection bevels may enclose an angle of between 2° and 4° with a surface of the mold body that forms an edge of the blind holes.

In the case of the mold according to the invention, provision may be made for each blind hole to have a cross-sectional area which lies in a cross-sectional plane and which has a plurality of additional areas and sides connecting the additional areas, and for a respective one of the additional areas to in each case extend further outwards than the sides adjoining the respective additional area. In this respect, the blind holes form negatives of the insulation elements, such that all preceding statements relating to the insulation elements can correspondingly be transferred to the blind holes.

According to a particularly preferred configuration, provision is made for the mold body to be at least partially translucent or transparent to electromagnetic rays of a spectrum comprising the infrared range and/or the visible light range and/or the ultraviolet range, such that the electromagnetic rays can penetrate from the mold body into the blind holes. The spectrum particularly preferably comprises a range of 300 nm to 500 nm. Expediently, the mold body, and possibly also the coating, is formed from a material which is resistant to the electromagnetic rays. The mold body may be formed from a quartz glass, polycarbonate, polymethyl methacrylate (PMMA), polyamide (PA), in particular PA12 amorphous, or from a silicone with or without fibre reinforcement, for example by a woven glass fabric.

In a refinement, provision may be made for the mold to comprise at least one source for the electromagnetic rays. The source may be arranged within the mold body. As an alternative or in addition, the source is arranged outside the mold body, such that the rays can penetrate through an optical interface of the mold body into the latter. The source may be arranged, for example, on that side of the mold body which lies opposite to the blind holes, in order to irradiate the blind holes from below. The source may comprise light-emitting diodes (LEDs). By way of the source, radiation of heat may also be effected in order to heat the enveloping material so as to transform it into the solid, one-piece form.

The object on which the invention is based is also achieved by a method for producing a stator for an electric machine, in particular according to one of the preceding claims, comprising the following steps: providing a mold according to the invention; providing a stator core which has an axial end side, and a plurality of shaped conductors which protrude from the stator core at the end side and which each have, at the end side, at least one end portion comprising a free end of the shaped conductor, wherein arrangements of at least two of the end portions are connected to one another in an electrically conductive and mechanical manner in such a way that each arrangement forms a connecting portion which has a first cross-sectional area that lies in a predefined cross-sectional plane and that has corner portions and side portions lying between the corner portions; filling the blind holes with a flowable or pulverulent enveloping material; introducing the connecting portions into the blind holes; allowing the connecting portions to be enveloped by the enveloping material; and transforming the enveloping material into a solid, one-piece form, such that the enveloping material forms a plurality of insulation elements which each envelop at least one of the connecting portions, and such that each insulation element has a second cross-sectional area which lies in the cross-sectional plane and which has, for each corner portion of the first cross-sectional area of the connecting portion enveloped by the insulation element, an additional area and sides lying between the additional areas, wherein a respective one of the additional areas extends further in a direction pointing away from the first cross-sectional area than the sides which adjoin the additional area.

The enveloping material can be transformed into a solid, one-piece form by a curing operation or at least an incipient gelling operation or fixing operation of the enveloping material. In the case of the pulverulent enveloping material, the transformation may be effected by a sintering process, in particular by fluidized bed sintering.

Particularly advantageously, in the case of the method according to the invention, a compromise between conventional immersion processes and a conventional full potting process is realized. The material usage of the enveloping material is considerably lower than in the case of a full potting process and only insignificantly greater than in the case of an immersion process. Advantageously, the high material thickness realized by means of the additional area achieves good insulation of the corner portions and additionally enables tolerance compensation in the case of the position of the corner portions.

In the case of the method according to the invention, provision may advantageously be made for the connecting portions to be introduced in an introduction direction as far as an introduction position, which is predefined in particular by a stop in the blind holes, and the method further comprises the following step which is carried out between the step of allowing engulfment and the curing step: removing a first part of the connecting portions from the blind holes counter to the introduction direction, such that the first part of the connecting portions is wetted by the enveloping material and a second part of the connecting portions remains within the enveloping material. It is thus possible in particular for the above-described change in the material thickness in the region of the intermediate position and an overlap of the stripped region with respect to that region of the shaped conductor which has already been insulated with the surface coating to be realized in a simple manner.

In the case of the method according to the invention, provision may furthermore be made for the step of transforming the enveloping material into a solid, one-piece form to comprise irradiating the enveloping material with the electromagnetic rays.

The step of transforming the enveloping material into a solid, one-piece form may in particular comprise heating the enveloping material. This may be effected for example by means of current heat, a furnace, infrared radiation or induction. However, cold curing is also possible. As an alternative or in addition, the method according to the invention further comprises the following step which is carried out prior to the introduction step: heating the end portions. This makes it possible to obtain a decrease in the viscosity of the enveloping material, in particular in the case of a resin, an improved discharge of air bubbles and a more efficient work of adhesion.

In a preferred configuration of the method according to the invention, provision is also made for a step of removing the connecting portions, with the insulation elements enveloping them, from the mold. This step is carried out in particular after gelling of the enveloping material. The removal step may be followed by a further step of carrying out an impregnating process with further, subsequent curing or solidification. The curing of the insulation element may also take place after further processing and together with an impregnating resin of the stator, with the result that there is a reduction in time and costs.

Prior to the steps of filling the enveloping material and introducing the connecting portions, the method according to the invention may further comprise a step of applying a material that reduces the adhesion of the mold body into the blind holes. In this regard, the materials already mentioned above (silicone, PTFE, FEP, PFA) may be used as non-permanent coatings. It is also conceivable for the blind holes to be wetted with a release wax, release spray or release lacquer as material to be applied in liquid form.

The object on which the invention is based is also achieved by an electric machine for a vehicle, comprising a rotor and a stator according to the invention or a stator obtained by the method according to the invention, wherein the rotor is rotatably mounted in the stator core.

The electric machine is preferably an, in particular permanently or electrically excited, synchronous machine or an asynchronous machine. The electric machine may be configured to drive the vehicle.

The object on which the invention is based is also achieved by a vehicle, comprising wheels for movement of the vehicle and an electric machine according to the invention, wherein the electric machine is configured to at least indirectly drive at least one of the wheels of the vehicle.

The vehicle according to the invention is for example a pure electric vehicle or a battery electric vehicle (BEV). The vehicle according to the invention may also be a hybrid vehicle, that is to say may also comprise a further engine, in particular a combustion engine, in addition to the electric machine.

The electric machine of the vehicle, said electric machine being in the form of an electric motor, may drive the at least one wheel directly or via an interposed gear mechanism. The vehicle may have an axle which is coupled to the at least one wheel and which directly or indirectly drives the electric rotating machine of the vehicle, said electric machine being in the form of an electric motor.

All the statements relating to the stator according to the invention can be analogously transferred to the mold according to the invention and the method according to the invention, the electric machine according to the invention and the vehicle according to the invention, and therefore the above-mentioned advantages can also be achieved thereby.

Further advantages and details of the present invention will emerge from the exemplary embodiments described below and from the drawings. The drawings are schematic illustrations in which.

Figure 3:
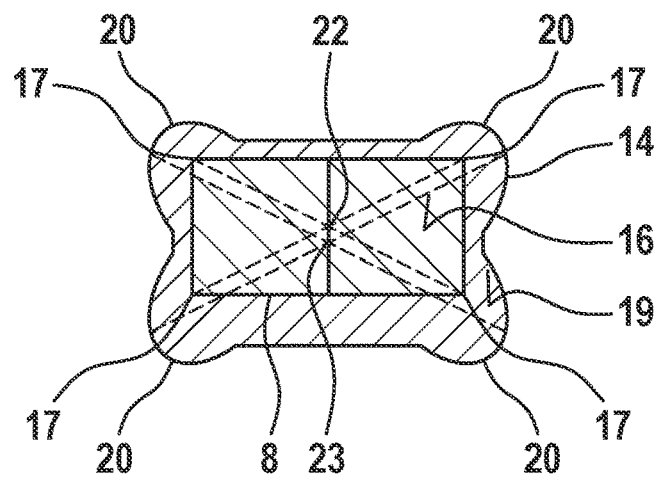
Figure 4:
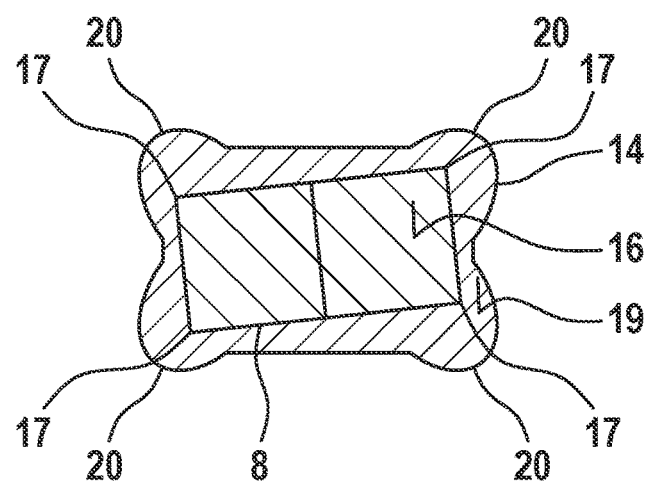
Figure 5:
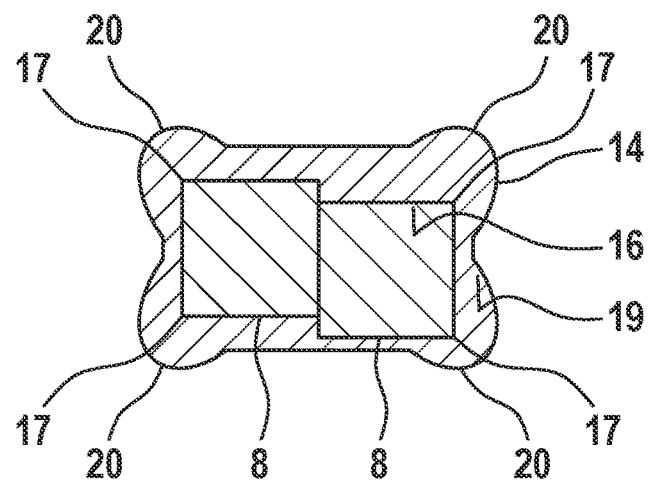
Figure 6:
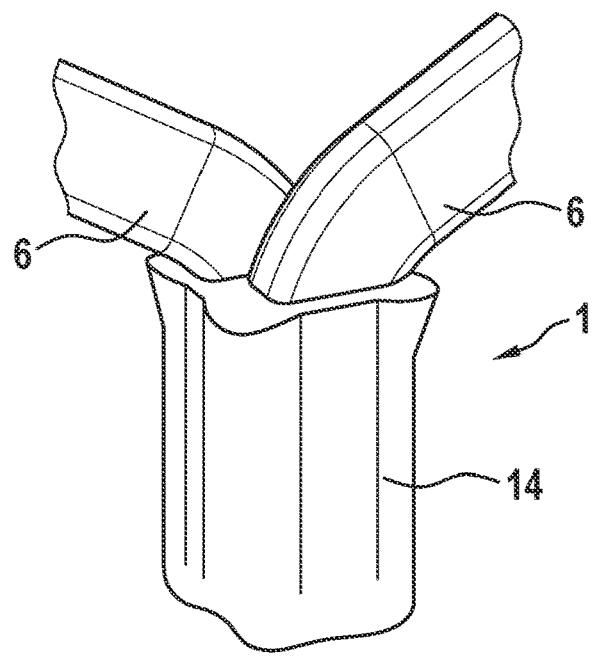
Figure 7:
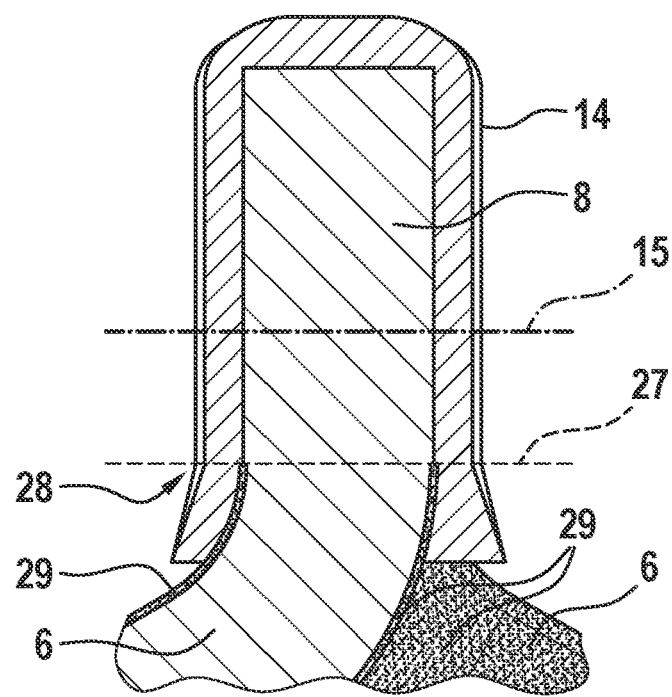
Figure 8:
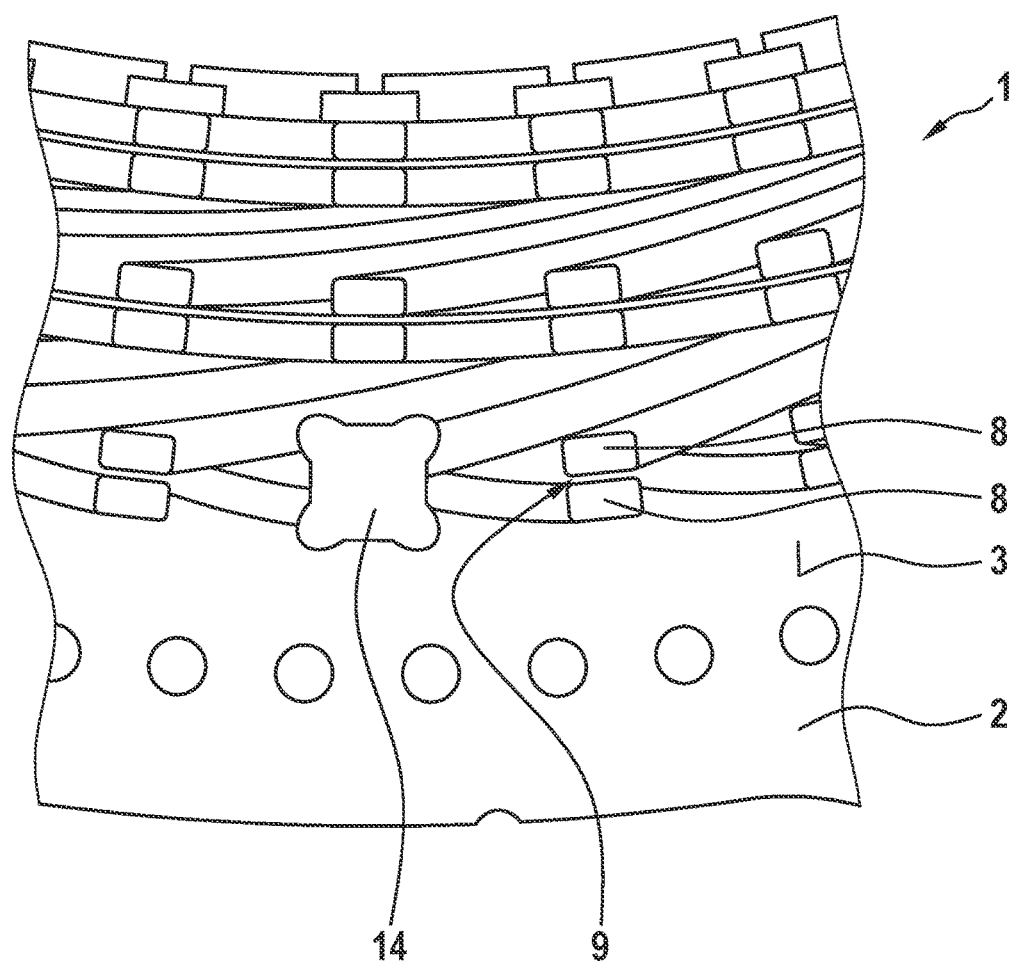
Figure 9:
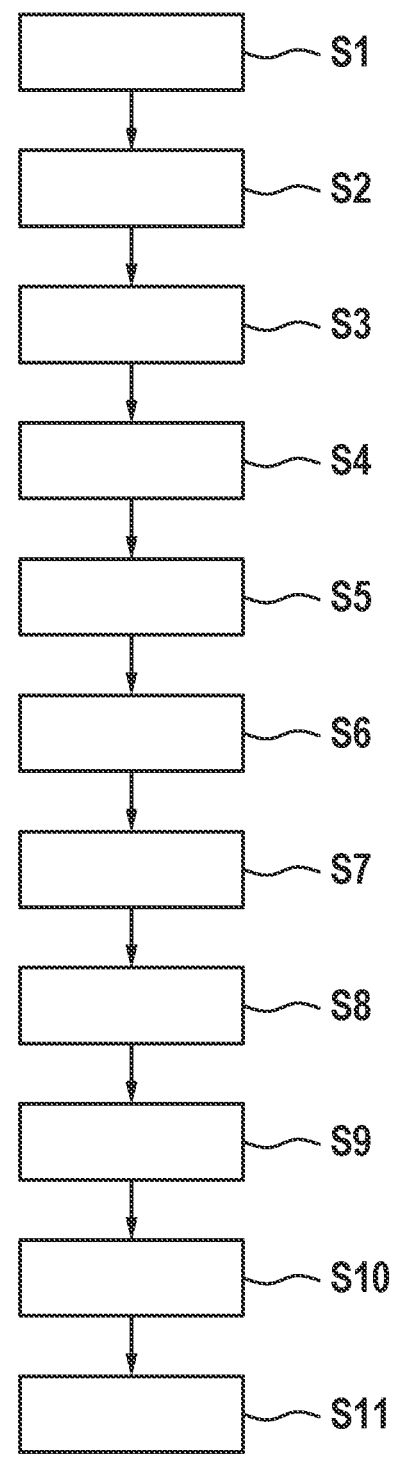
Figure 10:
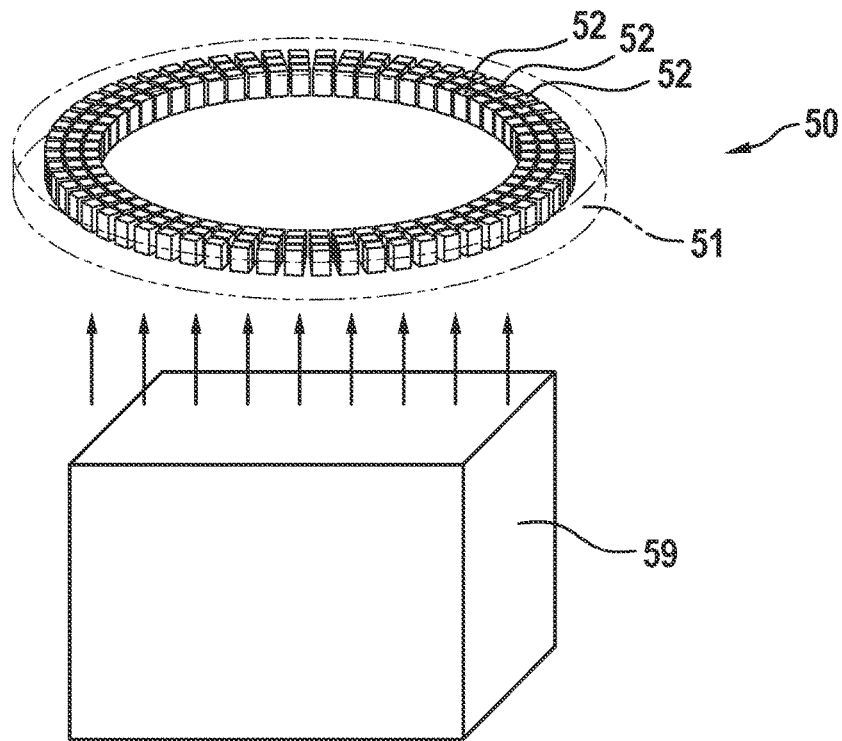
Figure 11:
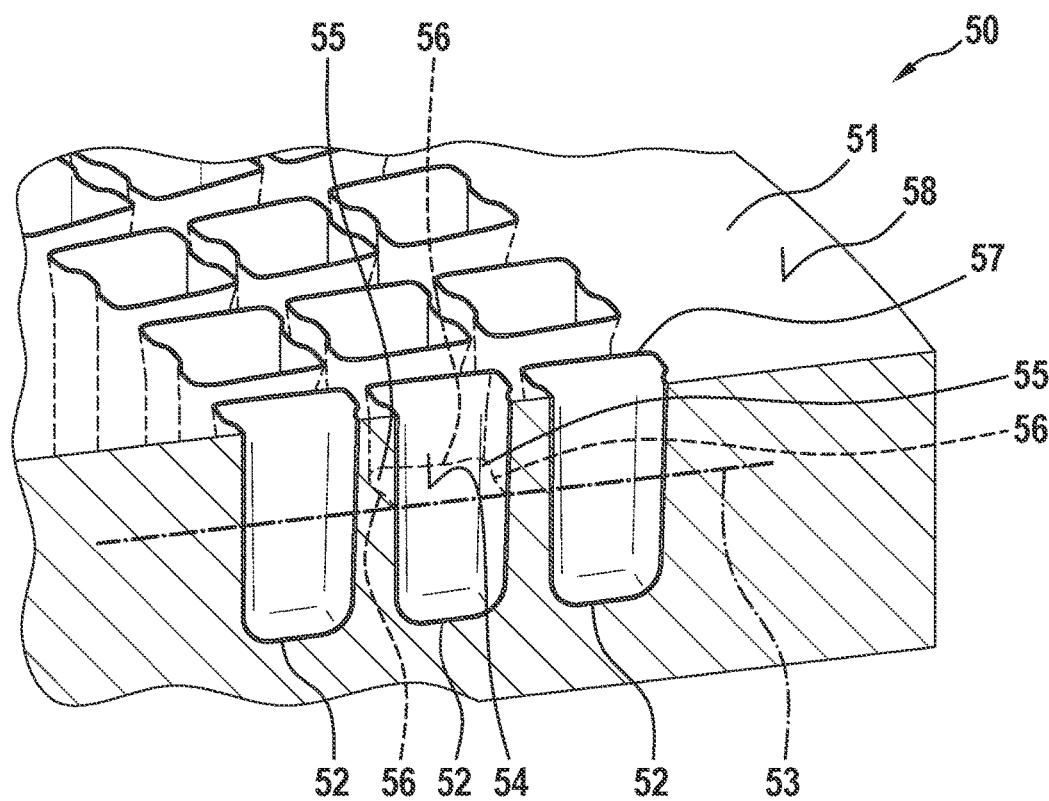
Figure 12:
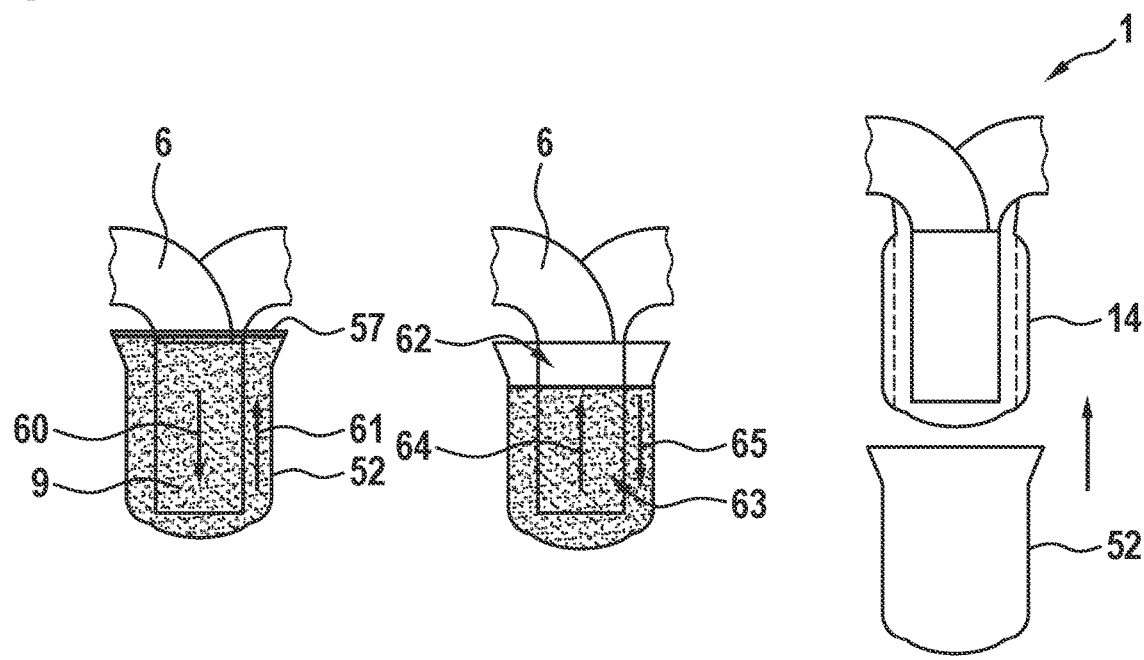
Figure 13:
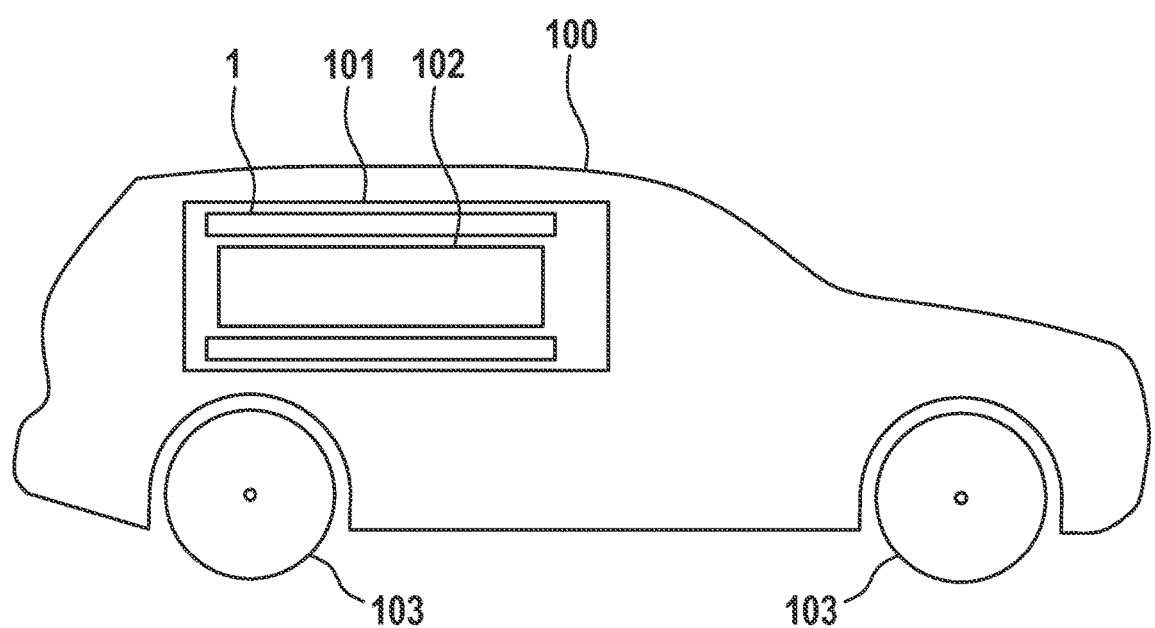

FIGS. 3 to 5 each show a sectional view of the stator according to the first exemplary embodiment for the elucidation of manufacturing tolerances;

FIG. 6 shows a perspective view of the stator according to a second exemplary embodiment in the region of an insulation element;

FIG. 7 shows a sectional view of the stator according to the second exemplary embodiment in the region of the insulation element;

FIG. 8 shows a top view of the stator according to the second exemplary embodiment in the region of the insulation element;

FIG. 9 shows a flow diagram of a first exemplary embodiment of the production method according to the invention;

FIG. 10 shows a perspective illustration of an exemplary embodiment of the mold according to the invention;

FIG. 11 shows a sectional illustration of the exemplary embodiment of the mold;

FIG. 12 shows a schematic diagram for explanation of a second exemplary embodiment of the method according to the invention and of a third exemplary embodiment of the stator according to the invention; and FIG. 13 shows a schematic diagram of an exemplary embodiment of the vehicle according to the invention with an exemplary embodiment of the electric machine according to the invention.

Figure 1:
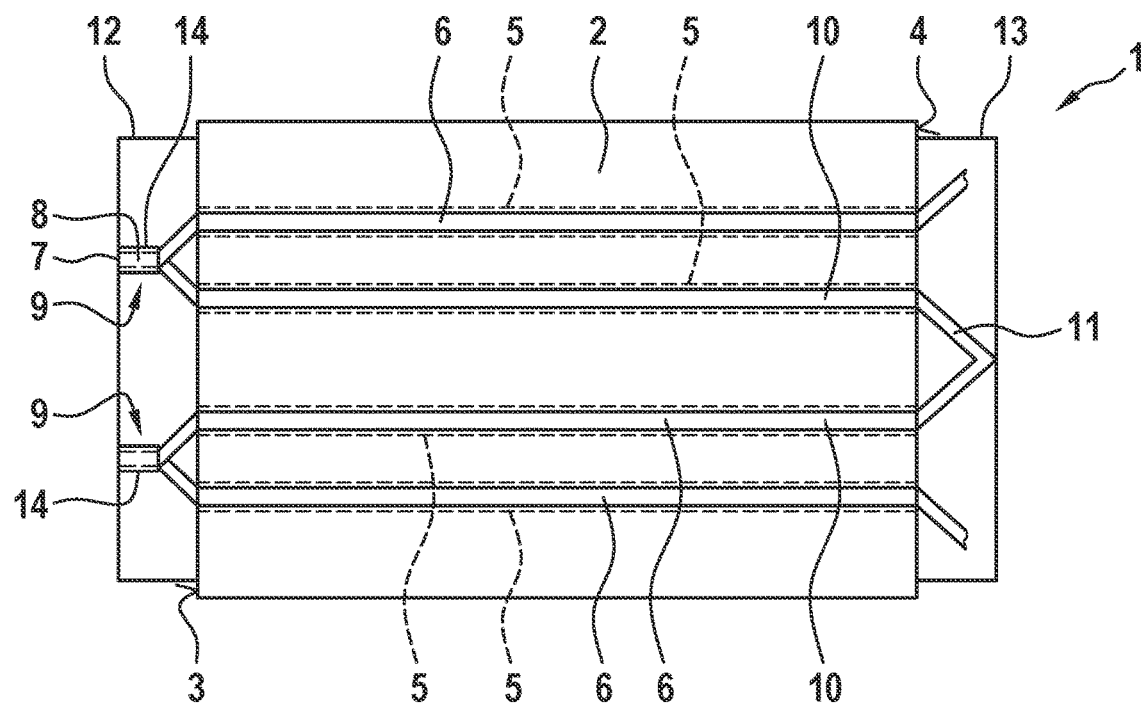
FIG. 1 shows a schematic diagram of a first exemplary embodiment of the stator according to the invention.

FIG. 1 is a schematic diagram of a first exemplary embodiment of a stator 1.

The stator 1 has a stator core 2 with an axial end side 3. The end side 3 lies opposite to a further axial end side 4 of the stator core 2. Here, the stator core 2 is by way of example in the form of a laminated stator core made up of a multiplicity of individual laminations which are electrically insulated in relation to one another and which are composed of a soft-magnetic material. A multiplicity of slots 5 which are arranged distributed in the peripheral direction, which extend from the end side 3 to the further end side 4 and only four parts of which are illustrated by way of illustration in FIG. 1 are formed within the stator core 2.

The stator 1 also has a plurality of shaped conductors 6 which protrude from the stator core at the end side 3 and which have, at the end side 3, two end portions 8 comprising a respective free end 7 of the shaped conductor 6. Arrangements of the end portions 8, here by way of example pairs of the end portions 8, are connected to one another in an electrically conductive and mechanical manner in such a way that each pair forms a connecting portion 9.

The shaped conductors 6 form a stator winding of the stator, which is in the form of a hair pin winding in the present exemplary embodiment. In this regard, each shaped conductor 6 has two leg portions 10, which form the free ends 7, and a head portion 11 which is arranged at the further end side 4 and which connects the leg portions in an electrically conductive manner. The leg portions 10 connected by the head portion 11 are arranged in two slots 5 at different positions in the peripheral direction. The leg portions 10 and the head portion 11 are formed in one piece by bending of a metal rod, in particular composed of copper. At the end side 3, the leg portions 10 are also bent on the other side of the position at which they exit the stator core 2, such that two leg portions 10 of different shaped conductors 6 in different slots 5 are connected to one another by the connecting portions 9. At the end sides 3, 4, the shaped conductors each form a winding head 12, 13 of the stator 1.

The stator 1 also has a plurality of insulation elements 14 which each envelop one of the connecting portions 9 and which are each formed from an electrically insulating material. The insulation elements 14 are formed for example from a cured resin, for example a one-component or two-component resin.

Figure 2:
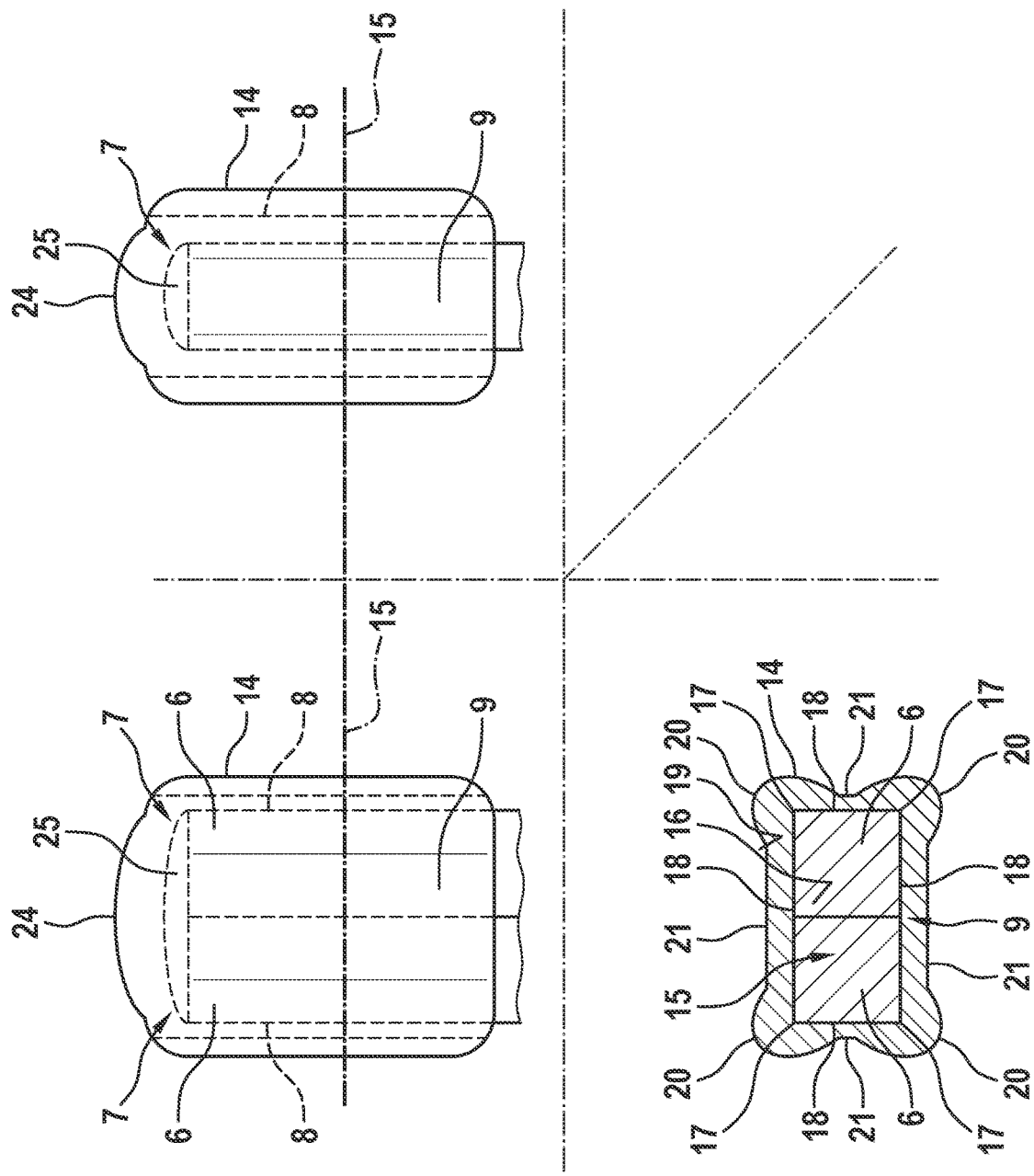
FIG. 2 shows a multiview orthographic projection of the stator according to the first exemplary embodiment in the region of an insulation element.

FIG. 2 is a multiview orthographic projection of the stator 1 according to the first exemplary embodiment in the region of one of the insulation elements 14. The lower image in this case shows a section through a cross-sectional plane 15.

Each connecting portion 9 has a first cross-sectional area 16 (indicated by non-dense hatching) in the cross-sectional plane 15. The first cross-sectional area 16 has four corner portions 17 and four side portions 18 which lie between the corner portions 17. Each insulation element 14 has a second cross-sectional area 19.

The second cross-sectional area 19 has, for each corner portion 17, a rounded additional area 20 and rectilinear sides 21 lying between the additional areas 20. Provision is thus made of four additional areas 20 and four sides 21. Each additional area 20 of the second cross-sectional area 19 of the insulation element 14 extends further in a direction pointing away from the first cross-sectional area 16 than the two sides 21 which adjoin the additional area 20.

FIG. 3 to FIG. 5 each show a sectional view of the stator 1 according to the first exemplary embodiment for the elucidation of manufacturing tolerances, the illustration corresponding to the lower image in FIG. 2.

When manufacturing the stator 1, it may happen that individual connecting portions 9 do not lie exactly on a circle or do not lie exactly on one of a plurality of concentric circles, for instance because a bending process of the shaped conductors 6 has a certain tolerance.

In this regard, FIG. 3 shows a first centre point 22 of the first cross-sectional area 16 and a second centre point 23 of the second cross-sectional area 19, which are defined by a point of intersection of two diagonals which connect the corner portions 17 and the additional areas 20, respectively. In the case of the connecting portion 9 and the insulation element 14 enveloping it, the centre points 22, 23 are displaced in relation to one another, such that the smallest distance of a respective corner portion 17 from an edge of the additional area 20 assigned thereto is greater than the smallest distance of the side portions 18 from the sides 21.

In FIG. 4, the side portions 18 of the first cross-sectional area 16 are rotated in relation to the sides 21 of the second cross-sectional area 19, such that the smallest distance of a respective corner portion 17 from an edge of the additional area 20 assigned thereto is greater than the smallest distance of the side portions 18 from the sides 21.

In FIG. 5, two corner portions 17 formed by one of the shaped conductors 6 of the pair or of the arrangement are displaced in relation to the two corner portions 17 formed by the other of the shaped conductors 6 of the pair, such that the smallest distance of a respective corner portion 17 from an edge of the additional area 20 assigned thereto is greater than the smallest distance of the side portions 18 from the sides 21.

As a result of the additional areas 20, it is thus possible in the case of tolerance-induced incorrect positioning of the connecting portion 9 with respect to the insulation element 14 both in the event of a displacement (FIG. 3) and a rotation (FIG. 4) and in the event of an offset of the shaped conductors 6 relative to one another (FIG. 5) for a sufficient material thickness of the insulation element 14 to be ensured in the region of the corner portions 17, where the highest electrical field strengths typically occur.

Again with reference to FIG. 2, each insulation element 14 has a convex protuberance 24 at the free ends 7. This ensures a sufficient material thickness of the insulation element 14 in the region of the free ends 7 when the materially bonded connection, that is to say in particular the welding, of the end portions 8 gives rise to a rounded material accumulation 25 at the free ends 7.

FIG. 6 to FIG. 8 each show a stator 1 according to a second exemplary embodiment, FIG. 6 being a perspective view of the stator 1 in the region of an insulation element 14, FIG. 7 being a sectional view of the stator 1 in the region of the insulation element 14, and FIG. 8 being a top view of the stator 1 in the region of the insulation element 14. For reasons of clarity, only a single insulation element 14 is shown in FIG. 8. Provided nothing to the contrary is described below, all the statements relating to the first exemplary embodiment can be transferred to the further exemplary embodiments described below, wherein components which are identical or of identical action are provided with identical reference designations.

In the case of the stator 1 according to the second exemplary embodiment, each insulation element 14 has, from its end 26 facing the stator core 2 as far as an intermediate position 27 lying between the end 26 and the cross-sectional plane 15, a profile which tapers towards the free ends 7, and the material thickness thereof increases at the intermediate position 27 so as to form a shoulder 28. As a result, bends of the shaped conductors 6 can be covered by the insulation element 14.

Moreover, it can be seen in FIG. 7 that the shaped conductors 6 have an electrically insulating surface coating 29. The shaped conductors 6 are stripped in the region of the end portions 8, such that the insulation element 14 rests directly on an electrically conductive material of the shaped conductors 6 and the insulation elements 14 overlap the surface coating 29.

FIG. 9 is a flow diagram of a first exemplary embodiment of a production method for a stator 1 according to one of the above-described exemplary embodiments or a stator 1 according to a third exemplary embodiment in which the insulation elements 14 are formed as shown in the right-hand image of FIG. 12. In this respect, for the description of the method reference is made to the preceding statements and FIG. 1 to FIG. 8.

The method comprises a step S1 of providing the stator core 2 and the shaped conductors 6, which are connected to one another in an electrically conductive and mechanical manner so as to form the connecting portions 9. The method further comprises a step S2 of providing an exemplary embodiment of a mold 50.

FIG. 10 and FIG. 11 show the mold 50, FIG. 10 being a perspective illustration and FIG. 11 being a sectional illustration.

The mold 50 comprises a mold body 51 and a plurality of blind holes 52 which are arranged along three concentric circles. The blind holes 52 are each configured to receive one of the connecting portions 9. In this case, each blind hole 52 has a third cross-sectional area 54 which lies in a third cross-sectional plane 53 and which has a plurality of additional areas 55 and sides 56 connecting the additional areas. The shape of the third cross-sectional area 54 corresponds in this case to the second cross-sectional area 19, and the blind holes 52 at least partially form negatives of the insulation elements 14. The blind holes 52 also have ejection bevels which enclose an angle of between 2° and 4° with a surface 58 of the mold body 51 that forms an edge 57 of the blind holes.

In the present exemplary embodiment, the mold body 51 is translucent or transparent to electromagnetic rays of a spectrum comprising the infrared range and/or the visible light range and/or the ultraviolet range, such that the electromagnetic rays can penetrate from the mold body into the blind holes 52. In this regard, the mold body may be formed, for example, from quartz glass, a ceramic, polycarbonate, polymethyl methacrylate (PMMA), polyamide (PA), in particular PA12 amorphous, or from a silicone with or without a woven glass fabric or a woven fibre fabric.

The mold 50 further comprises a source 59 for the electromagnetic rays. The source 59 is arranged outside the mold body, such that the rays can penetrate through an optical interface of the mold body 51 into the latter.

The method further comprises a step S3 of applying a material that reduces the adhesion of the mold body 51 into the blind holes 52. In this regard, a non-permanent mold, for example composed of silicone, polytetrafluoroethylene (PTFE), fluoroethylene-propylene (FEP) or perfluoroalkoxy polymers, may be provided as material that reduces the adhesion, or the blind holes 52 may be wetted with a release wax, release spray or release lacquer as material to be applied in liquid form.

The method further comprises a step S5 of filling the blind holes 52 with a flowable or pulverulent enveloping material. The enveloping material is the resin, which has already been described above, in a flowable, not yet cured state or a powder, for example a resin present in powder form.

In a step S6 of the method, the end portions 8 or the connecting portions 9 are heated.

In a step S7 of the method, the connecting portions 9 are inserted into the blind holes 52. In this regard, the introduction direction is shown by an arrow 60 in the left-hand image of FIG. 12. As a result of the introduction, the enveloping material rises, as shown by an arrow 61, within the blind hole 52 towards the edge 57 of the blind hole 52. The method further comprises a step S9 of allowing the connecting portions 9 to be engulfed by the enveloping material.

As shown in the middle image of FIG. 12, in a step S8 of the method, a first part 62 of the connecting portions 9 is then removed from the blind holes 52 counter to the introduction direction, such that the first part 62 of the connecting portions 9 is wetted by the enveloping material and a second part 63 of the connecting portions 9 remains within the enveloping material. As a result of the removal in the direction illustrated by an arrow 64, the level of the enveloping material in the blind hole 52 decreases according to an arrow 65.

In a step S9 of the method, the enveloping material is transformed into a solid, one-piece form, such that the potting compound forms the insulation elements 14 which envelop the connecting portions 9. The transformation continues at least until the flowable enveloping material is gelled, and comprises irradiation of the potting compound with the electromagnetic rays by way of the source 59. In the case of a pulverulent enveloping material, the transformation into the solid, one-piece form is effected by fluidized bed sintering, resulting in crosslinking of the powder in the blind hole 52.

This is then followed by a step S10, which is illustrated in the right-hand image of FIG. 12, of removing the connecting portions 9, with the insulation elements 14 enveloping them, from the mold. Finally, in a step S11, an impregnating process with further curing of the insulation elements 14 may be effected.

According to a further exemplary embodiment of the production method and of the mold 50, the blind holes 52 are fixedly lined with a coating that reduces an adhesion of the mold body 51. The coating may likewise comprise silicone, PTFE, FEP or PFA. In this case, step S3 can be omitted.

According to a further exemplary embodiment, the source 59 is arranged within the mold body 51.

According to a further exemplary embodiment of the production method and of the mold 50, there is no source and the mold body 51 may be opaque. In this case, step S9 comprises, instead of irradiation, heating of the enveloping material, for example by means of current heat, a furnace, infrared radiation or induction. However, cold curing of the enveloping material is also possible.

FIG. 13 is a schematic diagram of an exemplary embodiment of a vehicle 100 with an exemplary embodiment of an electric machine 101.

The electric machine 101, for example a permanently or electrically excited synchronous motor or an asynchronous motor, comprises a stator 1 according to one of the above-described exemplary embodiments or a stator 1 obtained by the method according to one of the above-described exemplary embodiments and a rotor 102. The rotor 102 is mounted rotatably with respect to the stator 1.

The vehicle 100 also has wheels 103. The electric machine 101 is configured to drive at least one of the wheels 103 indirectly, for example via a gear mechanism (not shown), or directly, for example in the form of a wheel hub motor. The vehicle 100 may also have an axle (not shown) which is coupled to the wheel 103 and which directly or indirectly drives the electric machine 101 of the vehicle 100.

The vehicle 100 according to the invention is a battery electric vehicle (BEV), a vehicle operated by means of a fuel cell or a hybrid vehicle. In the latter case, the vehicle 100 also has a combustion engine (not shown).

The invention claimed is:

1. A stator for an electric machine, comprising:
   a stator core which has an axial end side;
   a plurality of shaped conductors which protrude from the stator core at the end side and which each have, at the end side, at least one end portion comprising a free end of the shaped conductor, wherein arrangements of at least two of the end portions are connected to one another in an electrically conductive and mechanical manner in such a way that each arrangement forms a connecting portion which has a first cross-sectional area that lies in a predefined cross-sectional plane and that has corner portions and side portions lying between the corner portions; and
   a plurality of insulation elements which each envelop at least one of the connecting portions and which are each formed from an electrically insulating material;
   wherein each insulation element has a second cross-sectional area which lies in the cross-sectional plane and which has, for each corner portion of the first cross-sectional area of the connecting portion enveloped by the insulation element, an additional area and sides lying between the additional areas, wherein a respective one of the additional areas extends further in a direction pointing away from the first cross-sectional area than the sides which adjoin the additional area.

2. The stator according to claim 1, wherein the additional areas have a smaller radius than the sides.

3. The stator according to claim 2, wherein the first cross-sectional area has four of the corner portions and a first centre point defined by a point of intersection of two diagonals which connect non-peripherally adjacent corner portions, and the second cross-sectional area has four of the additional areas and a second centre point defined by a point of intersection of two diagonals which connect non-peripherally adjacent additional areas, wherein, in the case of at least some of the connecting portions and of the insulation elements enveloping them, the centre points are displaced in relation to one another, such that the smallest distance of a respective corner portion from an edge of the additional area assigned thereto is greater than the smallest distance of the side portions from the sides of the second cross-sectional area.

4. The stator according to claim 1, wherein the first cross-sectional area has four of the corner portions and a first centre point defined by a point of intersection of two diagonals which connect non-peripherally adjacent corner portions, and the second cross-sectional area has four of the additional areas and a second centre point defined by a point of intersection of two diagonals which connect non-peripherally adjacent additional areas, wherein, in the case of at least some of the connecting portions and of the insulation elements enveloping them, the centre points are displaced in relation to one another, such that the smallest distance of a respective corner portion from an edge of the additional area assigned thereto is greater than the smallest distance of the side portions from the sides of the second cross-sectional area.

5. The stator according to claim 1, wherein, in the case of at least some of the connecting portions and of the insulation elements enveloping them, the side portions of the first cross-sectional area are rotated in relation to the sides of the second cross-sectional area, such that the smallest distance of a respective corner portion from an edge of the additional area assigned thereto is greater than the smallest distance of the side portions from the sides of the second cross-sectional area.

6. The stator according to claim 1, wherein, in the case of at least some of the connecting portions and of the insulation elements enveloping them, the two corner portions formed by one of the shaped conductors of the arrangement are displaced in relation to the two corner portions formed by the other or another of the shaped conductors of the arrangement, such that the smallest distance of a respective corner portion from an edge of the additional area assigned thereto is greater than the smallest distance of the side portions from the sides of the second cross-sectional area.

7. The stator according to claim 1, wherein each insulation element
has a convex protuberance at the free ends, and/or
each insulation element has a profile which tapers from its end facing the stator core towards an intermediate position lying between the end and the cross-sectional plane.

8. A mold for producing a stator for an electric machine, according to claim 1, comprising a mold body and a plurality of blind holes which are arranged along a circle and which are each configured to receive a connecting portion, which is formed by an arrangement of at least two end portions which comprise a free end of shaped conductors of the stator and which are connected to one another in an electrically conductive and mechanical manner, and a flowable or pulverulent enveloping material.

9. The mold according to claim 8, wherein
each blind hole has a cross-sectional area which lies in a cross-sectional plane and which has a plurality of additional areas and sides connecting the additional areas, and a respective one of the additional areas in each case extends further outwards than the sides adjoining the respective additional area.

10. The mold according to claim 8, wherein
the mold body is at least partially translucent or transparent to electromagnetic rays of a spectrum comprising the infrared range and/or the visible light range and/or the ultraviolet range, such that the electromagnetic rays can penetrate from the mold body into the blind holes.

11. The mold according to claim 10, further comprising at least one source for the electromagnetic rays, wherein the source
is arranged within the mold body and/or
is arranged outside the mold body, such that the rays can penetrate through an optical interface of the mold body into the latter.

12. A method for producing a stator for an electric machine, comprising the following steps:
providing a mold according to claim 8;
providing a stator core which has an axial end side, and a plurality of shaped conductors which protrude from the stator core at the end side and which each have, at the end side, at least one end portion comprising a free end of the shaped conductor, wherein arrangements of at least two of the end portions are connected to one another in an electrically conductive and mechanical manner in such a way that each arrangement forms a connecting portion which has a first cross-sectional area that lies in a predefined cross-sectional plane and that has corner portions and side portions lying between the corner portions;
filling the blind holes with a flowable or pulverulent enveloping material;
introducing the connecting portions into the blind holes;
allowing the connecting portions to be enveloped by the enveloping material; and
transforming the enveloping material into a solid, one-piece form, such that the enveloping material forms a plurality of insulation elements which each envelop at least one of the connecting portions, and such that each insulation element has a second cross-sectional area which lies in the cross-sectional plane and which has, for each corner portion of the first cross-sectional area of the connecting portion enveloped by the insulation element, an additional area and sides lying between the additional areas, wherein a respective one of the additional areas extends further in a direction pointing away from the first cross-sectional area than the sides which adjoin the additional area.

13. The method according to claim 12, wherein
the connecting portions are introduced in an introduction direction as far as an introduction position, which is predefined in particular by a stop in the blind holes, and the method further comprises the following step which is carried out between the step of allowing engulfment and the curing step:

removing a first part of the connecting portions from the blind holes counter to the introduction direction, such that the first part of the connecting portions is wetted by the enveloping material and a second part of the connecting portions remains within the enveloping material.

14. The method according to claim 12 wherein:

the mold body is at least partially translucent or transparent to electromagnetic rays of a spectrum comprising the infrared range and/or the visible light range and/or the ultraviolet range, such that the electromagnetic rays can penetrate from the mold body into the blind holes, and the step of transforming the enveloping material into a solid, one-piece form comprises irradiating the enveloping material with the electromagnetic rays.

15. The method according to claim 12, wherein the step of transforming the enveloping material into a solid, one-piece form comprises heating the enveloping material, and/or the method further comprises the following step which is carried out prior to the introduction step: heating the end portions.

16. An electric machine for an electrically drivable vehicle, comprising a rotor and a stator according to claim 1, wherein the rotor is rotatably mounted in the stator core.

17. The stator according to claim 1, wherein, in the case of at least some of the connecting portions and of the insulation elements enveloping them, the side portions of the first cross-sectional area are rotated in relation to the sides of the second cross-sectional area, such that the smallest distance of a respective corner portion from an edge of the additional area assigned thereto is greater than the smallest distance of the side portions from the sides of the second cross-sectional area.

18. The stator according to claim 1, wherein, in the case of at least some of the connecting portions and of the insulation elements enveloping them, the two corner portions formed by one of the shaped conductors of the arrangement are displaced in relation to the two corner portions formed by the other or another of the shaped conductors of the arrangement, such that the smallest distance of a respective corner portion from an edge of the additional area assigned thereto is greater than the smallest distance of the side portions from the sides of the second cross-sectional area.

19. The stator according to claim 1, wherein each insulation element has a convex protuberance at the free ends, and/or each insulation element has a profile which tapers from its end facing the stator core towards an intermediate position lying between the end and the cross-sectional plane.

20. A mold for producing a stator for an electric machine, according to claim 1, comprising a mold body and a plurality of blind holes which are arranged along a circle and which are each configured to receive a connecting portion, which is formed by an arrangement of at least two end portions which comprise a free end of shaped conductors of the stator and which are connected to one another in an electrically conductive and mechanical manner, and a flowable or pulverulent enveloping material.

* * * * *